United States Patent [19]
Byerley

[11] Patent Number: 5,354,405
[45] Date of Patent: Oct. 11, 1994

[54] BEAD LOCK DRUM FOR USE IN THE MANUFACTURE OF VEHICLE TIRES

[75] Inventor: Mark S. Byerley, Greenback, Tenn.
[73] Assignee: Wyko, Inc., Greenback, Tenn.
[21] Appl. No.: 154,813
[22] Filed: Nov. 18, 1993
[51] Int. Cl.⁵ .............................................. B29D 30/24
[52] U.S. Cl. .................... 156/415; 156/398; 156/417; 156/420
[58] Field of Search ............... 156/414, 417, 420, 415, 156/418, 419, 398, 400, 403

[56] References Cited

U.S. PATENT DOCUMENTS

| | | | |
|---|---|---|---|
| 2,367,831 | 1/1945 | Manson | 154/9 |
| 3,485,700 | 7/1969 | Cooper et al. | 156/417 |
| 3,547,733 | 12/1970 | Leblono | 156/420 |
| 3,598,673 | 12/1971 | Caretta | 156/132 |
| 3,644,162 | 2/1972 | Appleby et al. | 156/415 |
| 3,816,218 | 6/1974 | Felten | 156/398 |
| 4,010,058 | 3/1975 | Kubinski et al. | 156/415 |
| 4,131,500 | 12/1978 | Wilde et al. | 156/131 |
| 4,292,112 | 9/1981 | Kumagai | 156/415 |
| 4,521,269 | 6/1985 | Ozawa | 156/420 |
| 4,582,557 | 4/1986 | Enders | 156/401 |
| 4,636,277 | 1/1987 | Owen et al. | 156/417 |
| 4,780,171 | 10/1988 | Byerley | 156/417 |
| 5,047,108 | 9/1991 | Byerley | 156/417 |
| 5,089,077 | 2/1992 | Byerley | 156/351 |
| 5,223,074 | 6/1993 | Miyanaga et al. | 156/398 |
| 5,225,028 | 7/1993 | Bierens | 156/401 |

FOREIGN PATENT DOCUMENTS 1262582 3/1968 Fed. Rep. of Germany .

Primary Examiner—Geoffrey L. Knable
Attorney, Agent, or Firm—Paul E. Hodges

[57] ABSTRACT

A bead lock drum for use in the manufacture of vehicle tires and including multiple carriages disposed about a central shaft and carrying a plurality of circumference-defining segments, the carriages and segments being separable about a transverse plane of the drum for removal and insertion of spacers between adjacent aligned segments and suitable to alter the width dimension of the drum and permit the use of a single drum for making various width tires of a given rim size.

11 Claims, 9 Drawing Sheets

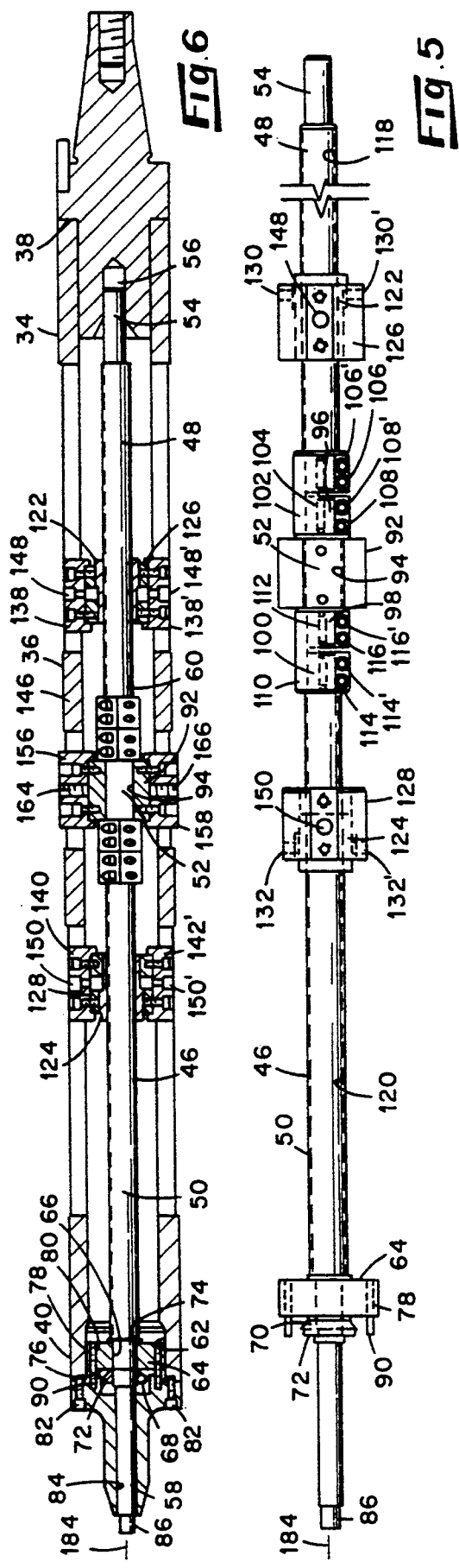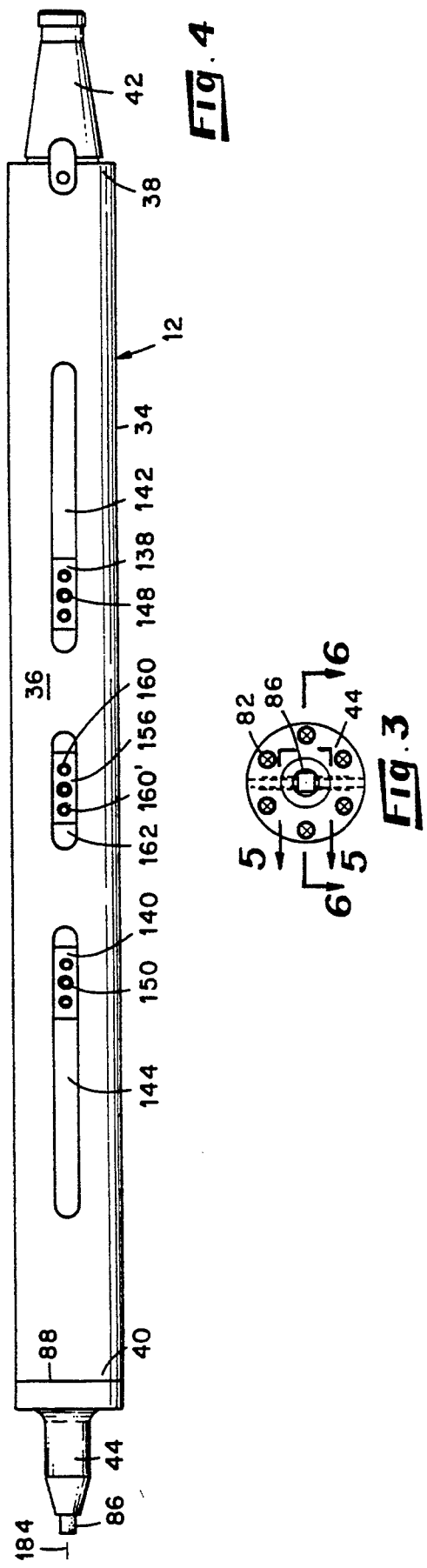

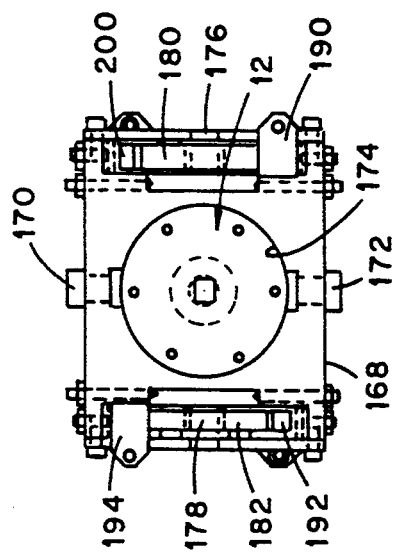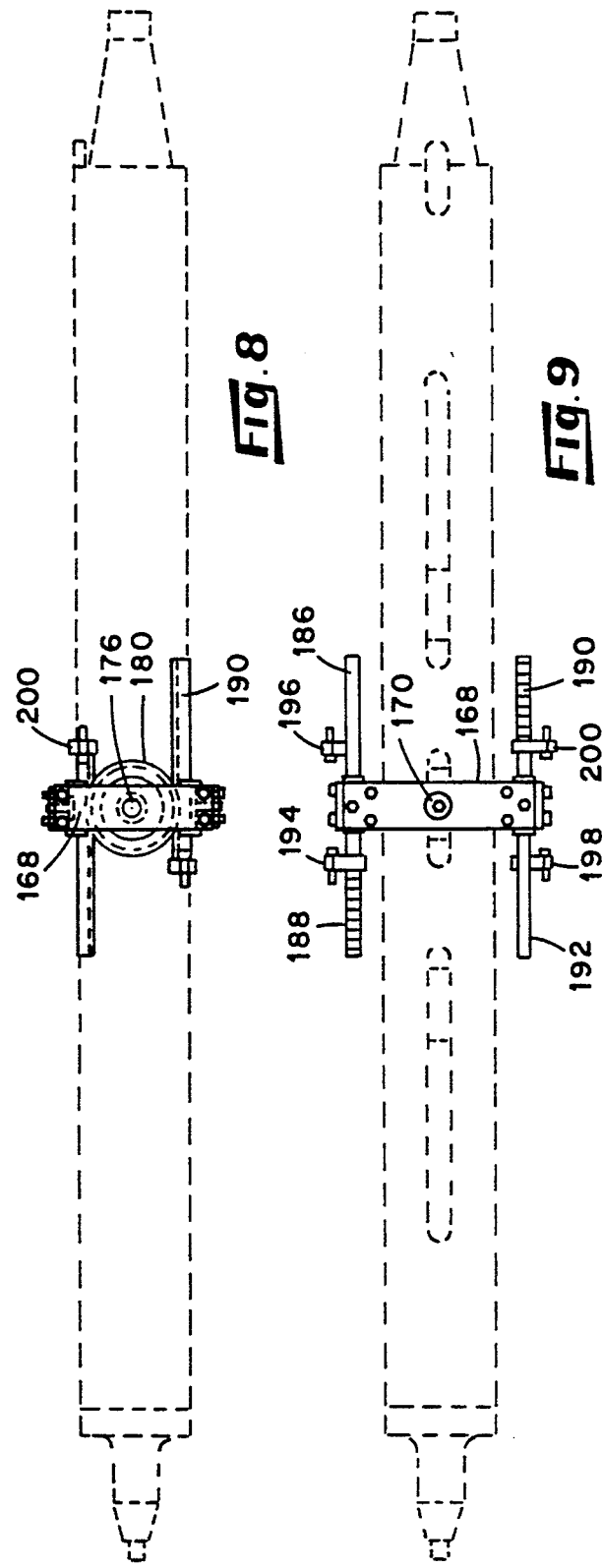

BEAD LOCK DRUM FOR USE IN THE MANUFACTURE OF VEHICLE TIRES

This invention relates to methods and apparatus for the manufacture of vehicle tires, and particularly to bead lock drums employed in one stage of the manufacture of such tires.

In the manufacture of vehicle tires having reinforcing cords incorporated therein, generally the process includes forming a fabric in which the reinforcing cords are embedded in a polymeric material. In this fabric, the cords run in the cross direction of the fabric. Generally, this fabric is formed into a cylindrical carcass on a rotatable bead lock drum, this process involving the laying down of at least one layer of the fabric around the circumference of the bead lock drum and with the reinforcing cords of the fabric extending between the opposite ends of the drum. In the art, the distance between the opposite ends of the drum (measured generally parallel to the rotational axis of the drum) is referred to as the width of the drum. The above described alignment of the cords causes the cords to be disposed on the bead lock drum in what eventually becomes the width dimension of the tire. As will be more apparent hereinafter, bead lock drums also provide for at least partial establishment of the height dimension of a tire, that is, the dimension of the tire as measured from the inner rim, radially outwardly of the tire to the outermost surface of the tire tread.

In the manufacture of vehicle tires having reinforcing cords incorporated therein, generally there is initially formed a cylindrical carcass which comprises a plurality of cords aligned generally parallel to one another and extending between the opposite ends of the cylindrical carcass, and a layer or layers of flexible polymeric material within which the cords are embedded.

Following the formation of the carcass on the bead lock drum, a pair of bead rings, which are nonexpandable and commonly made of metal, are applied about the opposite ends of the carcass and a portion of each end of the carcass is lashed back about the respective bead rings to anchor the bead rings in position with respect to one another and with respect to the carcass. The bead lock drum comprises a plurality of segments which define the outer circumference of the drum and which are movable radially of the centerline of the drum between retracted and expanded positions. With the segments retracted and the circumference of the drum at its minimum value, the bead rings are moved into their respective positions adjacent the opposite ends of the carcass on the drum. Various mechanisms have been employed in the prior art to "lock" the bead rings in their positions while portions of the ends of the carcass are folded back upon themselves with the bead ring captured within the fold. These lashed-back end portions of the carcass are bonded in their regions of overlayment with the body of the carcass, thereby securing the bead rings to the carcass.

Once the bead rings are locked in position with respect to the carcass, that portion of the carcass disposed between the opposing bead rings is expanded radially outwardly and simultaneously the two bead rings are caused to move inwardly toward one another to partially define the height of the tire. During this motion of the carcass and the captured bead rings, the bead rings must be kept parallel to one another, concentric with the rotational centerline of the drum, and square with such centerline.

For economic reasons, the time required to mount the bead rings and complete the formation of the carcass on the bead lock drum should be kept to a minimum, for example, about 40 seconds. This time limitation places demanding requirements upon the operation of the carcass forming apparatus.

In the formation of the carcass, there are several critical aspects of the operation. For example, the two bead rings must be locked in position with respect to one another such that they are concentric with the rotational centerline of the drum and parallel to one another. A variation of about one millimeter from concentricity is sufficient to cause the carcass to be rejected as defective. In like manner, variation of greater than about four millimeters from parallelism of the bead rings also may cause the carcass to be rejected as defective. Still further, the bead rings must be set and maintained square with the rotational centerline of the drum (that is, the beads must each occupy a plane passing through the centerline of the drum and which is at right angles to the centerline). Failure to maintain the bead rings square results in a tire which will neither mount properly on a vehicle wheel nor run true on the vehicle. Other requirements include such factors as: (1) the length of the cords as measured between the bead rings must be repeatable to a selected value between carcasses since this dimension is determinative of the size, i.e. width and/or height, of the resulting tire, (2) there should be no wrinkles in the lashed back portions of the ends of the carcass as they are wrapped about the bead rings, and (3) the turn-up of the ends of the carcass about the bead rings should be "tight" that is there should be no space or air gaps formed within the fold that is formed as the ends of the carcass are wrapped about the respective bead rings.

As regards the apparatus employed in the formation of the carcass, it is desired that the apparatus be adjustable to produce any of the several sizes in a given series of rim size tires. For example, a given bead lock drum desirably is capable of producing a large variety of tire widths, heights, etc. each having a 15-inch rim size, for example. In the prior art bead lock drums, changing the apparatus to accept a different tire size often required substantial disassembly of the drum, substitution of circumference-defining segments which were longer or shorter so as to adjust the width of the drum to accommodate the desired tire width, and reassembly of the drum. This size-change operation also often required time-consuming and costly realignment of the reassembled apparatus. In like manner, there was an inordinate cost associated with the fabrication and inventorying of the many circumference-defining segments required to adapt the drum to the manufacture of the several tire sizes in a series. Further, in certain of the prior art bead lock drums, each of the circumference-defining segments extended fully between the opposite ends of the drum and was mounted for radial expansion and contraction on a single central post. This mounting arrangement lends itself to poor alignment of the segments, but more importantly, typifies the problem of changing the segments when switching to the manufacture of a different tire size. That is, the only way to remove a segment or replace a segment in this type of prior art drum is by moving the segment radially outwardly from the drum when removing a segment or radially inwardly when installing a differently length segment. This segment exchange can only occur when the drum is at least partially disassembled to remove elements of the drum which block radial movement of the segments. Upon replacement of the segments, the drum must then be reassembled. This disassembly and reassembly are mechanical functions which are very time-consuming and care must be taken to ensure that the replaced segments are properly aligned concentrically of the rotational centerline of the drum.

In accordance with the present invention, there is provided a bead lock drum which rapidly and repeatedly produces accurately defined tire carcasses while eliminating the problems of the prior art relating to alteration of the drum to accommodate the production of differently sized tires of the same rim size. For example, known prior art bead lock drums are capable of a range of drum widths (tire widths) of about 5 inches. The present bead lock drum has a drum width adjustment range of at least 20 inches.

It is therefore an object of the present invention to provide a bead lock drum capable of repeatedly producing vehicle tire carcasses of uniform and accurate dimensions and orientation of the bead rings thereof.

It is another object of the present invention to provide a bead lock drum wherein at least a portion of the circumference-defining segments thereof are readily exchangeable with different-length segments.

It is another object of the present invention to provide a bead lock drum in which the outer circumference thereof is defined by a plurality of segments, each of which is of a length which is less than the overall width of the drum so that at least two individual segments must be aligned lengthwise with one another and along the width dimension of the drum to partially define the width of the drum, and a plurality of spacer means deployable between the innermost ends of the aligned segments to provide adjustability to the overall length of the aligned segments and spacers and define the full width dimension of the drum.

It is another object of the present invention to provide a bead lock drum having means for selectively adjusting the location of the transverse centerplane of the drum with respect to the length dimension of a rotational mounting shaft of the drum.

It is another object of the present invention to provide a method for the manufacture of a carcass for a vehicle tire.

Other objects and advantages of the invention will be recognized by one skilled in the art from the description of the invention provided herein, including the claims and the drawings in which:

FIG. 1 is a sectional view of one embodiment of a bead lock drum which incorporates therein several of the features of the present invention and in which the circumference-defining segments are in their collapsed condition;

FIG. 2 is a sectional view of the embodiment of the bead lock drum depicted in FIG. 1 and in which the section line has been varied from that of FIG. 1 to show various further features of the present invention and in which the circumference-defining segments are in their expanded condition, the lash-back tubes of the left-hand portion of the drum are partially expanded, and the fifth carriage is withdrawn outwardly from the drum;

FIG. 3 is a left-hand end view of the central shaft depicted in FIG. 4;

FIG. 4 is a side elevational view of one embodiment of a central shaft depicting various of the features of the present invention;

FIG. 5 is a side elevational view of one embodiment of a drive rod employed in the present invention and taken generally along the line 5—5 of FIG. 3;

FIG. 6 is a sectional view taken along the line 6—6 of FIG. 3 and depicting the drive shaft of FIG. 5 as it is disposed within the central shaft depicted in FIG. 4;

FIG. 7 is an end elevational view of a rack block mounted on the central shaft (depicted in phantom) of FIG. 4;

FIG. 8 is a side elevational view of the rack block of FIG. 7;

FIG. 9 is a top elevational view of the rack block of FIG. 7;

Figure 13:
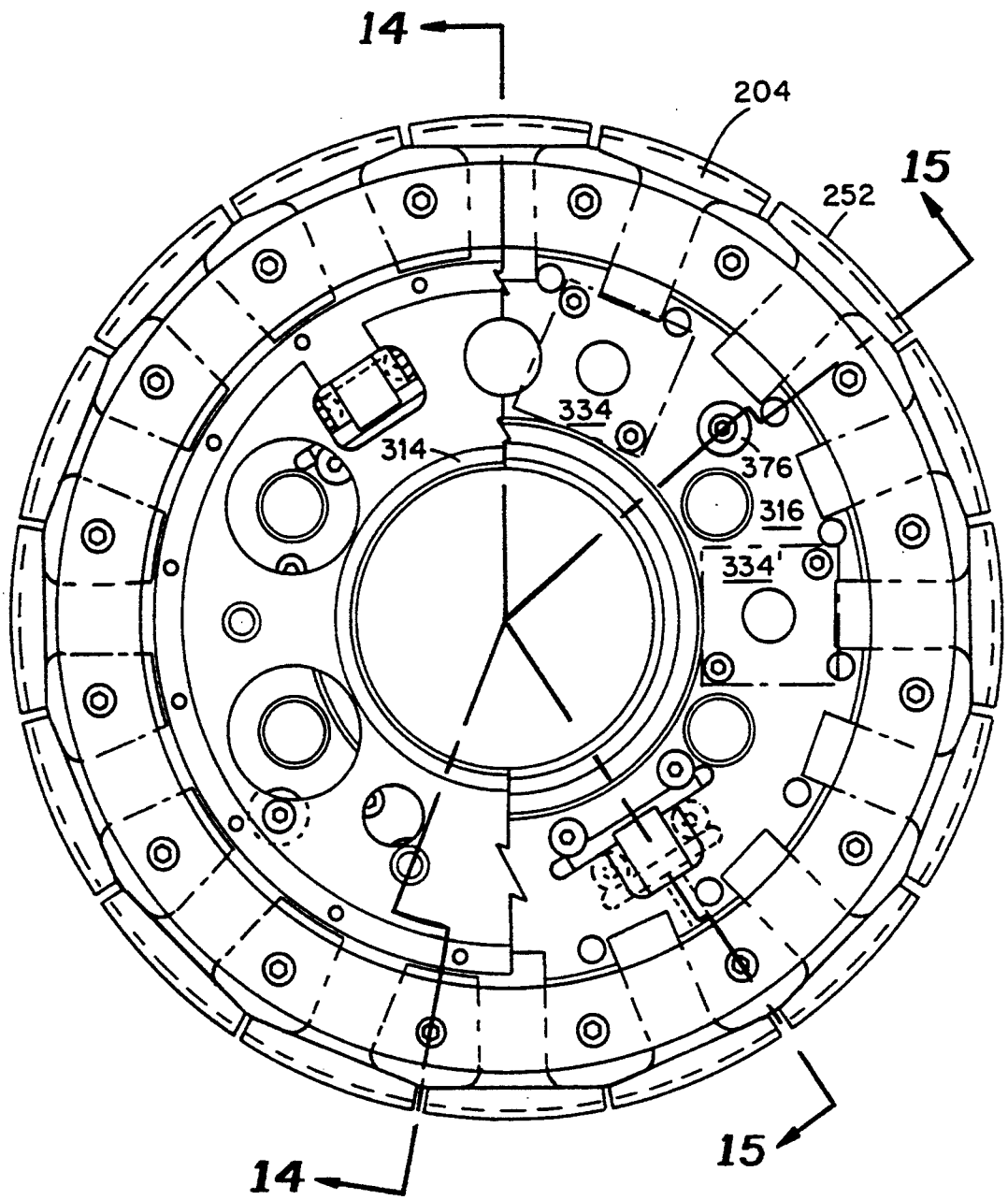
FIG. 13 is an end view of one embodiment of a fifth carriage employed in the present invention.
Figure 15:
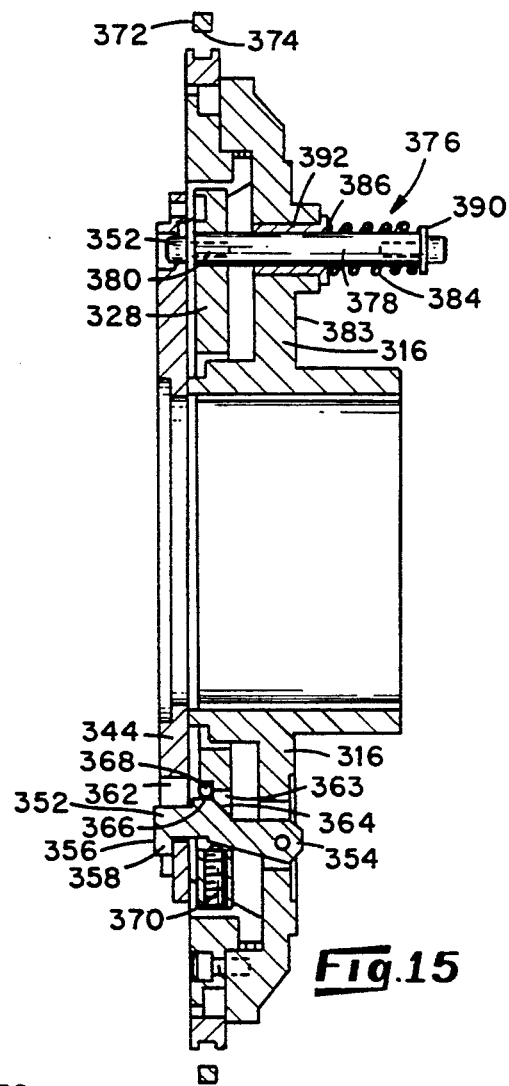
Figure 16:
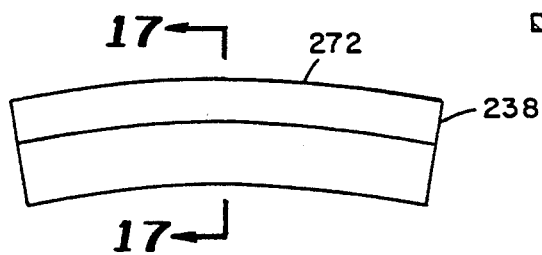
Figure 17:
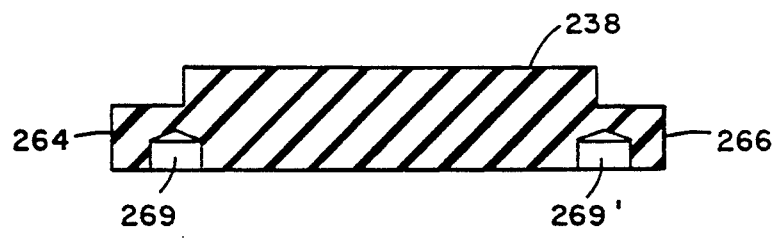

FIG. 15 is a further sectional view of one embodiment of a fifth carriage embodying various of the features of the present invention and taken generally along the line 15—15 of FIG. 13, FIG. 16 is an end elevational view of one embodiment of a spacer employed in the present invention, and FIG. 17 is a cross-sectional view of the spacer depicted in FIG. 16 and taken generally along the line 17—17 of FIG. 16.

Whereas in the description of the present device contained herein there is reference primarily to the right-hand half of the drum as viewed in the several Figures, it is important to note that the drum is substantially symmetrical about the transverse centerplane of the drum, the first and second carriages are substantially mirror images of each other, the third and fourth carriages are substantially mirror images of each other, the fifth and sixth carriages are substantially mirror images of each other, there are provided piston-cylinder mechanisms and latch mechanisms on both of the fifth and sixth carriages, such that the drum comprises two halves which are separable at the transverse centerplane of the drum in the depicted embodiments. This feature of the drum is readily recognized by one skilled in the art when viewing the several Figures and given the description contained herein, so that it is believed to be redundant to provide a detailed description of each of the components of the several carriages, etc. Where necessary to provide a complete understanding of the invention, counterparts of certain of the elements of the device are given prime numerals. It is to be further recognized, however, that several of the views of the device depicted in the several Figures are taken through different sections of the drum and therefore attention must be given to the section lines provided in certain of the Figures.

Further, in the present description, the terms "longitudinally inward" "longitudinally outward" "inward" or "outward" are used to define a direction toward or away from the transverse centerplane of the drum and generally parallel to the rotational axis of the drum which is also the centerline of a central shaft, unless the context of the usage of these terms is obviously otherwise. Still further, the term "longitudinal" or "longitudinally" refers to a direction substantially parallel to the rotational axis of the drum unless the context indicates otherwise The terms "inward" "outward" "inwardly" and "outwardly" are to be understood as referring to directions toward or away from the transverse centerplane of the drum unless the context of their usage clearly indicates otherwise.

Stated briefly, the present invention comprises a bead lock drum having a rotational axis and including a plurality of outer-circumference-defining segments which are mounted for radial movement between collapsed (minimum drum diameter) and expanded (maximum drum diameter) positions. The segments are in sets, one set defining a right hand portion of the circumference of the drum and a second set defining a left hand portion of the circumference of the drum. The segments of the two sets are aligned lengthwise with each other and with their respective length dimensions substantially parallel to the rotational axis of the drum. The combined lengths of the aligned segments is less than the desired total width dimension of the drum. The sets of segments are mounted on respective carriages provided within the drum and which are movable inwardly and outwardly of the drum along paths that are parallel to the rotational axis of the drum, but in opposite directions from a transverse plane through the rotational axis of the drum. By this means, the two sets of segments are movable away from each other to separate the sets of segments, or toward each other to bring the sets of segments toward the transverse plane. Between the most inwardly ends of the aligned segments, there is provided a plurality of spacers which are deployable between such inwardly ends of the aligned segments and which are captured between the inwardly ends of the aligned segments as they close toward the transverse plane, to thereby fully define the desired width dimension of the drum and the outer circumference of the drum. To change the width dimension of the drum, the two sets of segments are moved outwardly to open a space therebetween and thereby permit the ready removal of the spacers and the substitution of different length spacers therefor. Upon reversal of the direction of movement of the sets of segments to an inward direction, the sets of segments close and capture the fresh spacers therebetween to fully define a new overall width of the drum.

In another aspect of the invention, once a carcass has been formed on the bead lock drum, bead rings are positioned about the opposite ends of the carcass and are "locked" to the carcass in their respective end locations to establish a distance between the opposing bead rings that is equal to the desired width of the tire to be made. This locking operation establishes the bead rings concentric with the rotational axis of the drum, parallel to each other, and square with the rotational axis of the drum. This orientation of the bead rings is thereafter maintained as the carcass is lashed back about the bead rings and during that portion of the carcass treatment wherein the bead rings are brought inwardly of the drum and toward each other as that portion of the carcass between the bead rings is expanded to form an initial portion of the height of the tire.

Figure 1:
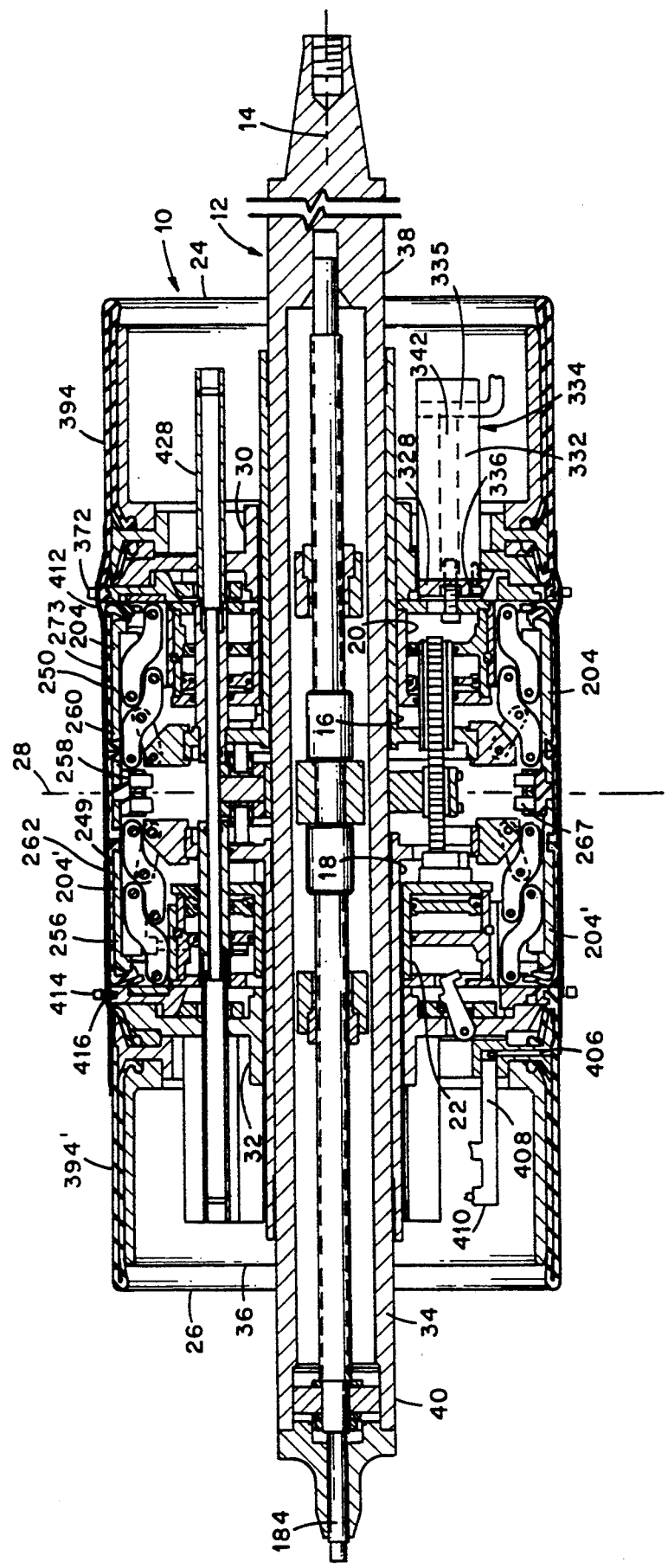
Figure 2:
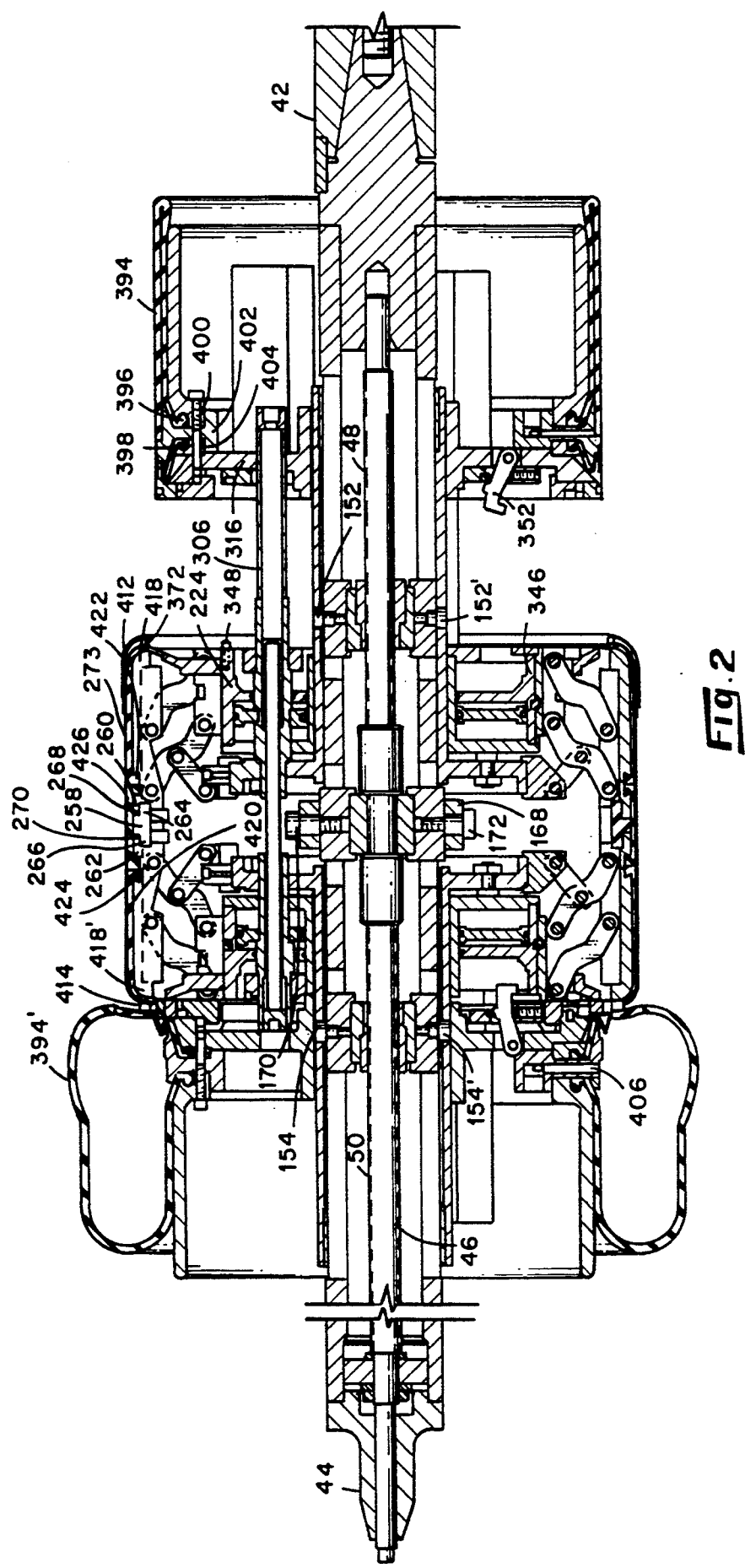

With reference to the several Figures, and initially to FIGS. 1 and 2, a preferred embodiment of the bead lock drum of the present invention includes a central shaft 12 having a longitudinal rotational centerline indicated by the numeral 14. Upon this shaft there are mounted first and second carriages 16 and 18 which are substantially mirror images of one another and which are slidable along the length of the shaft. These first and second carriages serve to carry thereon third and fourth carriages, respectively. These third and fourth carriages are slidably mounted on their respective one of the first and second carriages and are substantial mirror images of one another. These first, second, third and fourth carriages are concentric with the shaft 12. As viewed in FIG. 1, the first and third carriages form a portion of the right-hand end 24 of the drum and the second and fourth carriages form a portion of the left-hand end 26 of the drum. As will appear more fully hereinafter, the first and third carriages are movable longitudinally of the drum with respect to one another and at times independently of one another and at times cooperatively with one another. This same relationship exists between the second and fourth carriages. Further, the combination of the first and third carriages is movable longitudinally of the drum with respect to the combination of the second and fourth carriages, but these movements occur simultaneously and in opposite longitudinal directions to permit opening and closing of the drum along its transverse centerplane which is identified by the numeral 28.

Further, the first and second carriages provide sliding support for fifth and sixth carriages 30 and 32 mounted concentrically of the first and second carriages, respectively. The fifth and sixth carriages are substantially mirror images of one another. These fifth and sixth carriages are movable longitudinally of the drum independently of the first, second, third and fourth carriages, but at times move cooperatively therewith.

The movements of the several carriages will become more apparent from the following description. Motive power for the movement of certain of the carriages may be provided by piston-cylinder means, employing pressurized hydraulic or pneumatic power as is well known in the art and which will not be described in detail except as required for a complete understanding of the invention. Mechanical motive forces are also contemplated in the present invention, and in certain instances, the cooperative movements of certain of the carriages rely upon physical engagement between carriages, and/or linkages and/or spring means for positioning of one or more of the carriages or components thereof.

With specific reference to FIGS. 1 and 3–6, the central shaft 12 of the present bead lock drum (indicated generally by the numeral 10) includes a tubular housing 34 having an outer circumferential surface 36 which serves as a mounting surface for the first and second carriages 16 and 18 and includes opposite first and second ends 38 and 40. One end 38 of the housing 34 is closed by a plug 42 which is externally formed to provide a mating fitting for receipt in a rotational mounting of a conventional bead lock drum operational machine (not shown). The opposite end 40 of the housing 34 is closed by a further end cap 44 which also is externally configured to be received in the operational machine whereby the drum is rotatable about its longitudinal axis.

Centrally within and concentrically of the housing 34, there is mounted a drive rod mechanism 46 made up of first, second and third rods 48, 50 and 52. One end 54 of the first rod 48 is rotatably mounted in a bore 56 provided in the end cap 44 of the housing and the rod extends from such mounting location longitudinally inwardly toward the transverse centerplane 28 of the drum 10 and terminates short of this transverse centerplane. One end 58 of the second rod 50 is received through the end cap 44 and extends longitudinally inwardly of the housing 34 and terminates short of the transverse centerplane of the drum, and spaced apart from the terminal end 60 of the first rod 48.

As depicted in the FIGS. 3–6, the end 40 of the housing 34 is provided with internal threads 62. An adjustment nut 64 is threadably received in the threaded end of the housing and includes a central opening 66 therein through which the end 58 of the second rod 50 extends. Appropriate thrust bearings 68, a thrust washer 70 and a thrust nut 72 serve to rotatable mount the rod end 58 within the opening through the adjustment nut and fix the adjustment nut against a shoulder 74 machined on the rod 50 to thereby anchor the position of the adjustment nut longitudinally with respect to the rod 50. By this means, the threaded position of the adjustment nut within the threaded end of the housing fixes the longitudinal position of the second rod 50, hence the drive rod 46, with respect to the housing. On the longitudinally outward side 76 of the adjustment nut 64 there is provided a plurality, eight for example, positioning pins 78. Each of these pins is mounted in a bore 80 in the adjustment nut and projects from this opening a short distance.

The end cap 44 which closes the end 40 of the housing 34 is removably secured to the end of the housing as by means of set screws 82. The cap is provided with an internal longitudinal opening 84 through which is rotatably received the end 58 of the second rod 50. The outboard end of the rod terminates in the form of a lug 86 which is square in cross-section, for example, to receive thereon a wrench for rotating the drive rod 46 for reasons which will appear more fully hereinafter. On the inner face 88 of the cap 44, there are provided a plurality of bores 90 spaced circumferentially about the rotational centerline of the cap and capable of receiving therein the positioning pins 78 of the adjustment nut.

Internally of the housing 34 and aligned with the transverse centerplane 28 of the drum, there is provided a central hub 92 having a longitudinal opening 94 therethrough and within which there is rotatably received the third rod 52, the opposite ends of which project from the hub in the form of jack shafts 96 and 98. The internal end 60 of the first rod 48 terminates contiguous the end of the jack shaft 96 and the internal end 100 of the second rod 50 terminates contiguous to the jack shaft 98. A first split collar 102 surrounds the contiguous ends 60 and 104 of the first rod 48 and the jack shaft 96 to adjustably secure these ends in fixed relationship to one another. Set screws 106, 106' and 108, 108' serve to lock the split collar to the rod and shaft ends. In like manner, the a further split collar 110 surrounds the contiguous ends 100 and 112 of the second rod 50 and the jack shaft 98 to adjustably secure these ends in fixed relationship to one another, employing set screws 114, 114' and 116, 116'. By these collars 102 and 110, the rods 48 and 50 are secured in fixed relationship to one another to define the drive rod 46 and rotation of second rod 50 will result in like rotation of the first and third rods 48 and 52.

A portion of each of the first and second rods 48 and 50 between their respective outwardly rotationally mounted ends 54 and 58 and their inward ends 60 and 100 which are secured to the jack shafts 96 and 98, is provided with external threads 118 and 120. These threaded portions are of opposite hand threads. The first and second rods 48 and 50 are further rotationally mounted within the housing near, and on opposite sides of, the transverse centerplane of the drum as by means of bronze bearing nuts 122 and 124, each of which is secured by a nut holder 126 and 128, respectively. These nut holders 126 and 128, in turn, have secured thereto at least one key 138 and 140 which projects radially outwardly from the nut holders 126 and 128, respectively, and through respective elongated slots 142 and 144 through the wall 146 of the housing 34. By this means, the bearing nuts 122 and 124 are secured against rotation with respect to the housing 34, while permitting rotation of the drive rod 46 with respect to the housing, and permitting the sliding movement of each of keys 138 and 140 along the length of their respective slots, hence longitudinal movement, in opposite directions, of the keys 138 and 140. Each key 138 and 140 includes a threaded bore 148 and 150 therein which is accessible through the slots 142 and 144. The first and second carriages 16 and 18 are secured to these keys 138 and 140, respectively, by means of bolts 152 and 154 that are received within the threaded bores 148 and 150 to thereby lock the carriages from rotation relative to the shaft 12 while still permitting the longitudinal movement of the carriages along the shaft 12 (see FIGS. 2,4 and 6) in opposite directions upon rotation of the drive rod 46. In order for the first and second carriages to be positioned equidistantly on opposite sides of, and from, the transverse centerplane of the drum, the nut holders 126 and 128 must be precisely spaced equidistantly from, and on opposite sides of, the central hub 92. Adjustment of the central hub with the transverse centerplane of the drum is described hereinbelow.

Similarly, the central hub 92 is provided with a pair of key members 156 and 158, disposed 180 degrees apart about the circumference of the hub and secured to the hub as by set screws 160, 160'. These key members extend radially outwardly from the hub and through respective slots 162 (only one slot shown) that extend through the thickness of the housing wall 146 to thereby secure the hub against rotation with respect to the housing 34.

Referring to FIGS. 2, 4, 5 and 6, each of the key members 156 and 158 of the central hub includes a threaded bore 164 and 166 which serves as the points of attachment to the keys of a rack block 168 by means of bolts 170 and 172 (see FIG. 2). This rack block is generally rectangular in geometry and includes a central opening 174 through the thickness thereof and within which there is received the housing 34 of the shaft. On opposite sides of the rack block 168 there are provided jack shafts 176 and 178 which serve to rotatably mount thereon first and second pinion gears 180 and 182. Notably, the rotational axis of each pinion gear is aligned with both the longitudinal rotational axis 184 of the shaft 12 and with the transverse centerplane of the shaft 12 so that at all times the position of these pinion gears are representative of such alignment. The rack block 168 further serves to mount therein first and second racks 186 and 188 which mesh with the first pinion gear 180, and third and fourth racks 190 and 192 which mesh with the second pinion gear 182. The association of the racks with respect to the pinion gears is such that movement of either of the racks in a longitudinally inward or outward direction results in exactly the same extent of, but opposite in direction, movement of the other of the racks. The ends 194, 196, 198 and 200 of the several racks are anchored to the first and second carriages so that any longitudinally inwardly or outwardly displacement of either of these carriages is physically duplicated by the other of the carriages, albeit in an opposite direction. Further, by reason of the anchoring of the pinion gears to the rack block which, in turn, is anchored to the central hub 92, any longitudinal movement of the central hub along the third rod 52 results in a corresponding longitudinal displacement of the pinion gears, hence a longitudinal displacement of the racks. That is, any longitudinal displacement of the central hub (that is, the midplane of the drum) results in like displacement of the rotational axis of the pinion gears, hence a like displacement of the common "center" position of the racks which are in meshing relationship to the pinion gears. This arrangement permits alignment of the "center" position of the racks, hence center alignment of the first and second carriages, through adjustment of the longitudinal position of the central hub 92 along the rotational axis of the third rod 52, hence of the shaft 12.

Reference to FIG. 1 shows that the bore 56 provided in the plug 44 of the housing 34 is sufficiently deep that the end 54 of the drive rod 12 does not extend fully to the bottom of the bore. By this means, there is permitted longitudinal movement of the drive rod 12 relative to the shaft housing 34. Such longitudinal movement of the drive rod permits adjustment of the central hub to its proper alignment with the transverse centerplane of the drum. This adjustment is effected by turning the adjustment nut 64 until the central hub is properly aligned. Once the central hub is aligned, the end cap 44 is positioned over the end 58 of the housing 34 and with the bores 90 in the face of the end cap in alignment with the positioning pins 78 so that the positioning pins enter the bores to lock the adjustment nut 64 against rotation once the end cap is secured to the end of the housing by means of the set screws 32. A suitable number of equally spaced positioning pins 78 and a like number of bores in the face of the end cap 44 permits the desired alignment of the bores and pins upon small rotational movement of the end cap, hence there is no material movement of the adjustment nut when the end cap is engaged with the alignment pins and then rotated slightly to align the end cap for insertion of the set screws into the housing. Because the drive rod 12 is threaded through the adjustment nut 64, rotation of the drive rod effects longitudinal displacement of the drive rod within the housing, hence longitudinal displacement of the central hub, hence longitudinal displacement of the transverse centerplane of the drum.

Recalling that the keys 156 and 158 are fixedly secured to the first and second carriages, respectively, and therefore the physical spacing of each of these keys from opposites sides of the central hub establishes the physical spacing of the respective first and second carriages from the transverse centerplane of the drum, in the initial setup of the first and second rods 48 and 50 within the shaft housing 34 the collars 134 and 136 which surround the nut holders 126 and 128 are loosened with respect to the first and second rods 48 and 50. Thereupon, the distance of the first collar 134 from the central hub (drum transverse centerplane) is selected and the first collar 134 is fixedly secured to the first rod 48 by means of the set screws 130. Next, the distance of the second collar 136 from the central hub 92 is set to be equal, preferably within 0.0005", to the distance of the first collar from the central hub and the second collar 136 is secured to the second rod 50. By this means, the first and second carriages are also physically spaced equidistant from the central hub. Thereupon, any rotation of the drive rod 12 results in lateral movement of the nut holders 126 and 128 equal distances from or toward the centerplane of the drum, but in opposite longitudinal directions, hence like opposite movements of the first and second carriages. This equidistant positioning of the first and second carriages, among other things, serves to ensure longitudinal alignment of the several segments 204 which collectively define the outer circumference of the drum.

Referring to FIGS. 1, 2, and 10–12, the first carriage 16 includes a hollow cylindrical housing 208 within which is slidably received the housing 34 of the central shaft 12 to mount the first carriage on the shaft housing 34. A circumferential flange 210 is provided on the cylindrical housing 208 of the first carriage and projects radially therefrom. The cylindrical housing 208 of this first carriage provides support for the third carriage 20 which is slidably mounted on the outer circumference 206 of cylindrical housing 208 of the first carriage 16 for movement longitudinally of, and independently of, the cylindrical housing 208 of the first carriage 16. This third carriage 20 includes a circumferential flange 212 disposed on the longitudinally inward end 214 of a hollow cylindrical housing 216 that surrounds the housing 208 of the first carriage and provides for slidable mounting of the third carriage on the first carriage. As desired, a brass bearing 218 may be provided between the inner wall 220 of the housing 216 and the outer wall 206 of the housing 208. The third carriage 20 is further provided with a cylindrical slide ring 222 which includes a circumferential plate means 224 that is disposed on, and integrally formed with, the most radially outward portion 226 of the slide ring and defines a mounting surface for a plurality of mounting means 228 that provide for the mounting of one the ends 230 and 232 of a plurality of pairs of linkages 234 and 236, which, in turn, provide the pivotal mounting for a plurality of circumference-defining segments 204 that are disposed about the most radially outward portion of the drum. Each of the depicted linkages is "S"-shaped in side elevation view and the outboard ends 238 and 240 thereof are pivotally secured to a respective segment 204. The second 236 of the linkages 234 and 236 further includes a link 242 having one of its ends 244 pivotally secured to the second linkage 236 at approximately the midpoint of the second linkage, and its opposite end 246 pivotally secured to a mounting means 248 which is secured to a circumferential flange 210 provided on the housing 208 of the first carriage 16. It will be recognized, therefore, that longitudinal movement of the mounting means 228 for the two linkages 234 and 236, relative to the mounting means 248 for the link 242 results in radial displacement of that segment 204 which is mounted on the linkages 234 and 236. Movement of the mounting means 228 and 248 longitudinally toward each other results in radially outward displacement of the segment 204 and movement of the mounting means 228 and 248 away from each other results in radially inward displacement of the segment 204. Each of the other of the segments 204 is likewise mounted such that the segments are positioned parallel and in juxtaposition to one another to collectively define the outer circumference of approximately one-half of the drum circumference.

Figure 10:
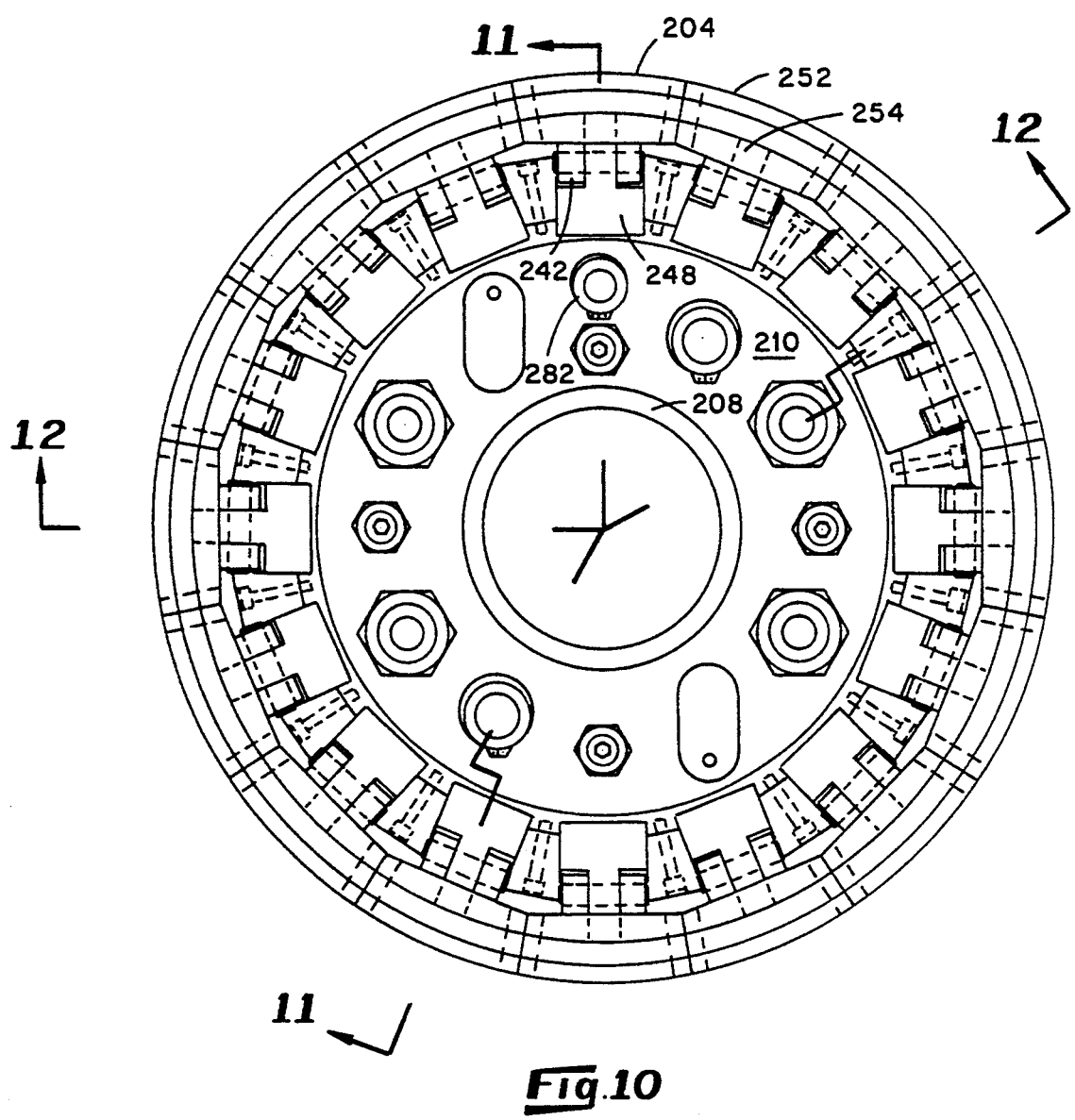
FIG. 10 is an end view of one embodiment of a first carriage employed in the present invention.

As depicted in the Figures, specifically FIGS. 1 and 2, the circumference of the drum is defined by a first and second sets 250 and 256, respectively, of segments 204. The first set 250 of segments 204 is mounted on the first and third carriage. As shown in FIG. 10 each of the segments of this first set includes a radially outwardly disposed arcuate portion 252 and a radially inwardly extending portion 254 to which the linkages and the link are pivotally mounted. A second set 256 of segments 204 is mounted on the second and fourth carriages 18 and 22. The segments of this second set are mirror images of the segments of the first set. As depicted, the total of the lengths of the segments of the two sets of segments is less than the total width dimension of the drum with the gap therebetween occurring at the transverse centerplane of the drum. This gap is filled as by means of a plurality of spacers 258 of equal individual lengths, (see FIGS. 1, 2, 11, 16 and 17) such length being sufficient to fill the longitudinal space between the spaced-apart inward ends 260 and 262 of the segments of the two sets of segments. The opposite ends 264 and 266 of each of the spacers are configured to be received in mating slots 268 and 270 or the like provided in the ends 260 and 262 of each of the segments. Preferably, at least one of the slots 268 or 270 is provided with a spring-loaded detent 267 which is received in a respective bore 269 in the end 264 of the spacer to aid in holding one end of each spacer fixed with respect to one of the sets of segments while the drum is open. Each spacer includes a radially outward arcuate portion 272 so that collectively the two sets of segments and the spacers define the full desired width and a full and substantially continuous outer circumference of the drum. A carcass 273 is formed in encircling relationship to the outer circumference of the drum.

Figure 11:
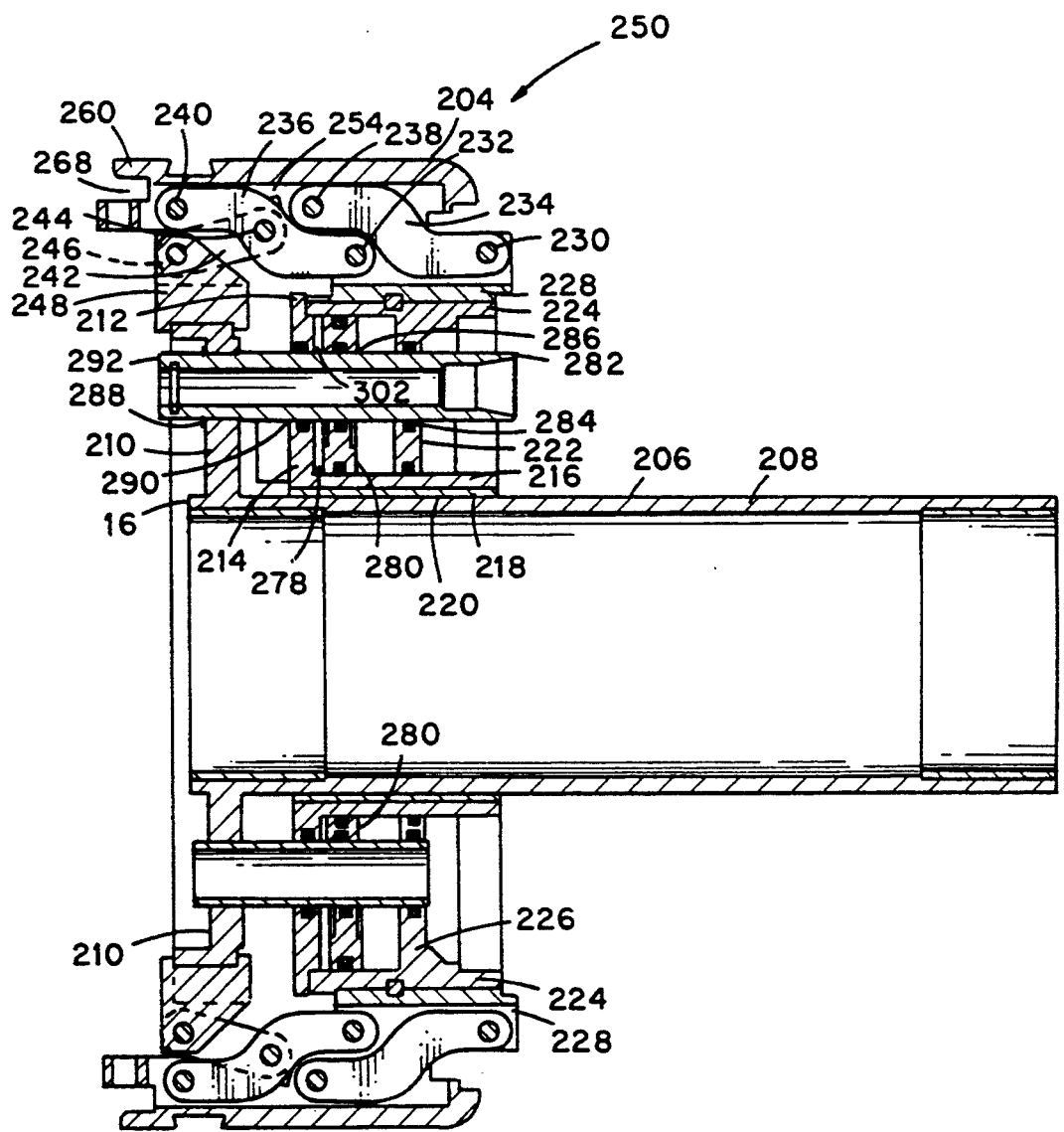
FIG. 11 is a sectional view taken generally along the line 11—11 of FIG. 10 and depicting various of the components of first and third carriages embodying various of the features of the present invention.
Figure 12:
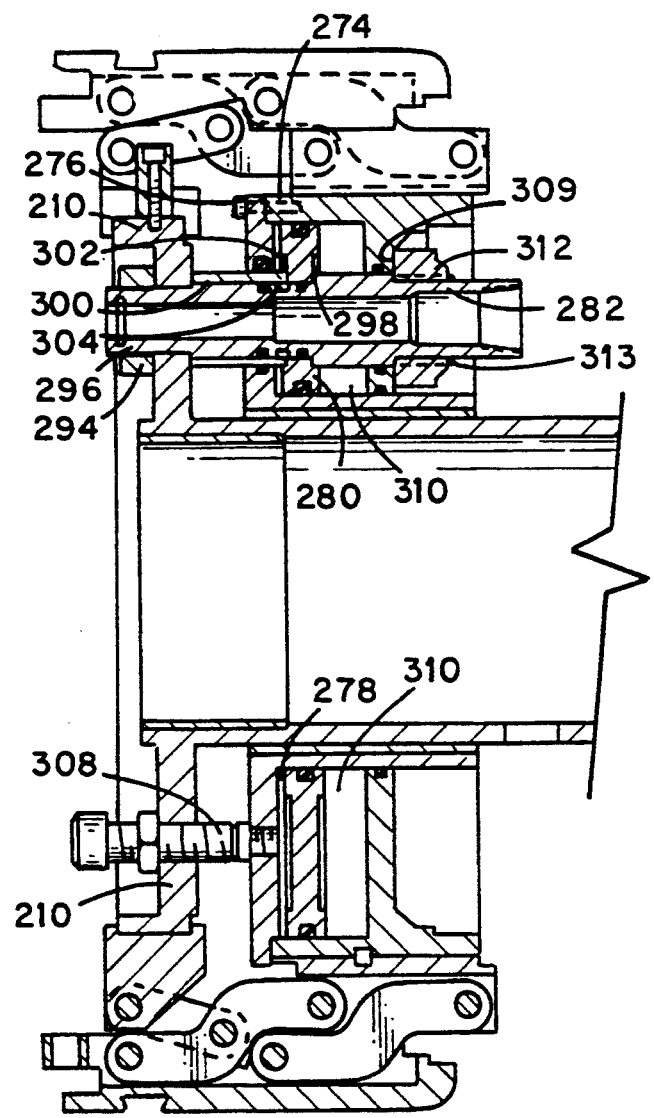
FIG. 12 is a further sectional view of one embodiment of first and third carriages embodying various of the features of the present invention and taken generally along the line 12—12 of FIG. 10.

As depicted in FIG. 11 and 12, the radially outward portion of the slide ring 222 is secured at its longitudinally inward edge 274 to the circumferential flange 212 of the third carriage 20 as by means of bolts 276 (see FIG. 12) and there is defined therebetween a closed cylindrical chamber 278 within which there is mounted a ring piston 280. This piston is anchored in a fixed location with respect to the circumferential flange 210 of the first carriage 16 as by means of an air tube 282 which extends longitudinally through respective openings 284, 286, 288, and 290 in the slide ring 222, the ring piston 280, the circumferential flange 210 of the first carriage, and the circumferential flange 212 of the third carriage. The most inward end 292 of the air tube 282 is fixedly anchored within the opening 288 in the circumferential flange 210 of the first carriage 16 as by means of a lock nut 294 which is received on the externally threaded end 296 of the air tube. As best seen in FIG. 12, the ring piston 280 is immovably secured in position on the air tube by means of a shoulder 298 provided on the air tube outwardly of the piston and a cylindrical spacer 300 provided on the air tube inwardly of the piston and between the piston and the circumferential flange 210 of the first carriage. As depicted in FIG. 12, fluid flow communication between a source of pressurized air, for example, external of the drum, not shown, and the interior of the cylindrical chamber 278 is established by means of channels 302, 304, and an extension tube 306. Upon the introduction of pressurized air, for example, into the cylindrical chamber 278, the third carriage is urged longitudinally inwardly of the drum to a position as depicted in FIG. 2 whereupon the several linkages 234 and 236 and the links 242 are actuated to displace the several segments 204 (typical) radially outwardly of the drum. That is the effective circumference of the drum is expanded in response to the introduction of the pressurized air into the cylindrical chamber 278. The permissible extent of this longitudinally inward movement of the third carriage is established by means of an adjustable stop 308 provided in the circumferential flange 210 of the first carriage (see FIG. 12). A further cylindrical closed chamber 310 is defined on the outward side of the ring piston 280 and is in fluid communication with the source of pressurized air (air flow channel not visible). Upon release of the pressurized air within the cylindrical chamber 278, and upon the introduction of pressurized air to the chamber 310, the third carriage is urged longitudinally outwardly, thereby withdrawing the segments radially inwardly toward their collapsed position as depicted in FIG. 1, 11 and 12. This radially inward movement of the segments, hence the movement of the third carriage longitudinally outwardly of the drum, is halted when the third carriage engages the stop 309 which may be in the form of a nut 312 threadably received on the outward threaded end 313 of the air tube 282. The position of this nut along the length of the air tube provides adjustability of the most outward permissible position of the third carriage 20. It is to be noted that even though the longitudinal movements of the third carriage 20 are effected independently of the first carriage 16, these movements of the third carriage are limited by the elements of the first carriage, acting through the air tube, etc., hence these movements of the third carriage can only take place within the longitudinally range established by the first carriage. By this means, selection of the position of the first carriage dictates the longitudinal location of the range within which the movements of the third carriage may occur. In like manner, longitudinal repositioning of the first carriage can be used to provide like longitudinal repositioning of the third carriage, such repositioning of these carriages taking place simultaneously and without altering the alignment between the two carriages. In this regard, it is to be noted that rotation of the drive rod 46, acting through the nuts 122 and 124, and the keys 138 and 140 will serve to simultaneously move the first carriage and the third carriage, and all their accompanying components longitudinally outwardly of the drum and away from the transverse centerplane of the drum. Recalling that rotational movement of the drive rod 46 serves to move the second and first carriages in opposite directions, the rotation of the drive rod serves to open the drum into two portions, preferably halves, with the division occurring along the transverse centerplane of the drum. Once the drum has been opened along its transverse centerplane, it becomes a simple matter to remove and exchange the several spacers of the drum to thereby change the effective width dimension of the drum for use in forming different width carcasses for different sized tires.

Figure 14:
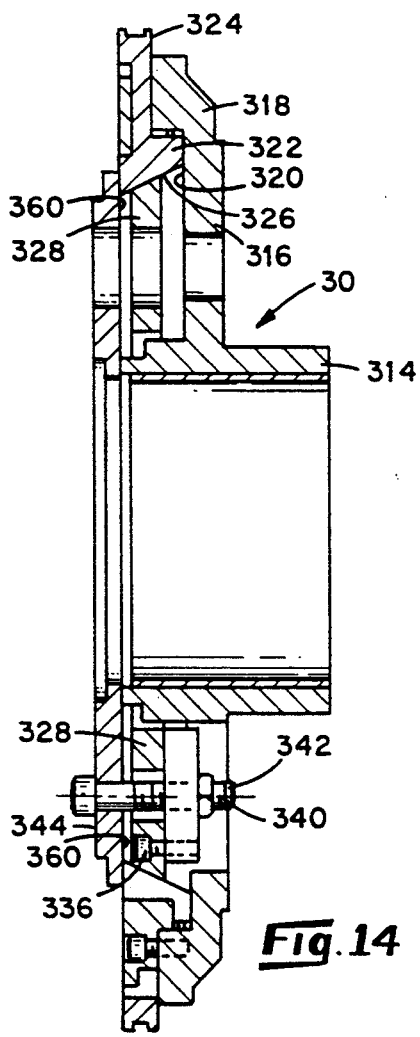
FIG. 14 is a sectional view taken generally along the line 14—14 of FIG. 13 and depicting various of the components of a fifth carriage embodying various of the features of the present invention.

A fifth carriage 30 is slidably mounted on the outer surface 36 of central shaft housing 34 as depicted in FIGS. 1 and 2. In FIGS. 13–15, the fifth carriage is depicted as including a central cylindrical housing 314 which is designed to encompass the circumference of the shaft housing 34. A circumferential flange 316 is integrally formed with the housing 314 and extends radially therefrom. The most radially outward end 318 of the flange includes a contact face 320 which is designed to engage the longitudinally outward face 322 of each of a plurality of bead locks 324. These several bead locks are individually mounted for radial sliding movement relative to the rotational axis of the drum. Each bead lock includes a sloping cam surface 326 and the cam surfaces of the several bead locks are engaged by a wedge ring 328 which, in turn, is mounted on the longitudinally inward face 330 of a cylinder member 332 of a double-acting piston-cylinder 334 as by means of bolts 336 and 338. As best seen in FIGS. 1 and 14, the outboard end 340 of a piston rod 342 of the piston-cylinder 334 is anchored to a circular latch plate 344 that is disposed concentrically of the shaft housing 34 and fixedly secured to the longitudinally outward edge 346 of the mounting plate 224 of the circumferential flange 212 of the third carriage as by bolt means 348 (see FIG. 2), and longitudinally inwardly of the wedge ring 328. In the preferred embodiment, there is provided at least two and preferably four of the piston-cylinders 334 disposed in equidistantly spaced-apart locations around the wedge ring 328 to permit uniform movement of the fifth carriage longitudinally inwardly and/or outwardly in response to extension and/or retraction of the piston rods 342.

As depicted in FIGS. 1, 2 and 15, the fifth carriage 30 is releaseably secured to the latch plate 344 of the third carriage as by means of a latch 352 having one of its ends 354 pivotally secured to the flange 316 and its other end 356 configured to enter an opening 362 through the latch plate 344 and pivot radially outwardly to cause a lug 358 on the end 356 to engage the longitudinally inward face 360 of the latch plate, thereby securing the fifth carriage against longitudinally outward movement when the latch in engagement with the latch plate. As best seen in FIGS. 2 and 15, a portion of the latch passes through an opening 363 in the wedge ring 328. On this portion of the latch there is provided a cam surface 364 having a flat 366 thereon. Within the opening in the wedge ring through which the latch extends, there is provided a latch rod 368 which is engaged by the cam surface 364. As best seen in FIG. 15, when the wedge ring is in its longitudinally inward position, the latch rod engages the flat 366 on the latch and locks the latch in its locking engagement with the latch plate. When the wedge ring is positioned in a longitudinally outward position, the latch rod is disengaged from the latch and the latch is pivoted out of locking relationship with the latch plate by the action of a spring plunger 370 which is also mounted in the opening 363 through the wedge ring 328 and opposite the latch rod 368. Preferably, a plurality of latches are provided at spaced apart locations on the fifth carriage to ensure uniform engagement of the fifth and third carriages when the latches are in locking positions.

With reference to FIGS. 1, 2, 14 and 15, and as noted above, the wedge ring 328 is fixedly secured to the face 330 of the cylinder member 332 of the piston-cylinder 334. Thus, when the wedge ring is in its longitudinally outward position as seen in FIG. 2, the latch 352 is in its unlatched position, extension of the piston rod 342 from the cylinder member 332 results in longitudinal outward displacement of the fifth carriage and all of its components, the latch plate providing an anchor against which the piston rod can act. This action of the present device provides for withdrawal of the bead lock mechanism of the fifth carriage and the fifth carriage itself from the bead ring so that further operations, such as stitching, etc. may be performed on the carcass prior to its removal from the drum.

To effect locking of the bead ring 372 to the fifth carriage, the piston rod 342 is retracted into the cylinder member 332, thereby moving the fifth carriage longitudinally inwardly until the inward faces 322 of the several bead locks 324 contact the outboard face 360 of the latch plate. In this position of the fifth carriage, the wedge ring 328 remains spaced apart from the face 360 of the latch plate and further withdrawal of the piston rod into the cylinder results in further longitudinally inward movement of the wedge ring. By reason of the camming engagement of the wedge ring with the several bead locks, such further inward movement of the wedge ring effects radially outward movement of the bead locks to cause these bead locks to engage the inner circumference 374 of the bead ring 372 and thereby lock the bead ring to the fifth carriage. After such locking engagement of the bead ring to the fifth carriage has been accomplished, any longitudinal movement of the fifth carriage effects a like longitudinal displacement of the locked bead ring. This ability to move the bead ring longitudinally inward of the drum is important in connection with the expansion of the central portion of the carcass 273 as will be further described hereinafter.

In FIG. 15, there is depicted a spring return mechanism 376 which serves to withdraw the wedge ring out of camming engagement with the bead locks when it is desired to release the bead ring. This mechanism includes a rod 378 having one of its ends 380 secured to the wedge ring as by means of a bolt 382. The rod extends from the wedge ring through an opening through the circumferential flange 316 of the fifth carriage and projects from the longitudinally outward face 383 of the flange to receive thereon a spring 384, one end 386 of which bears against the face 383 of the flange and other end 388 of which is secured on the rod by a snap ring 390 or the like. As necessary, a bushing 392 may be provided to facilitate sliding movement of the rod 378 within the opening through the flange. A plurality of these spring return mechanisms are provided in spaced apart locations on the flange 316 to effect uniform movement of the wedge ring. These spring mechanisms only effect withdrawal of the wedge ring toward its longitudinally outward position upon release of the pressurization within the piston-cylinder 334 at selected times within the cycling of the present device. Notably, such withdrawal of the wedge ring also effects release of the several latches which lock the fifth carriage to the latch plate 344 as described hereinabove.

Referring to FIGS. 1 and 2, the fifth carriage further includes an expandable lash-back tube 394 which includes ends 396 and 398 thereof which are anchored by mounting rings 400, 402 and 404 to the circumferential flange 316 of the fifth carriage 30. An air passageway 406 connects the interior of the tube 394 to a source of pressurized air (not shown) via a conduit 408 which includes a pressure relief valve 410. In its collapsed attitude, the tube lies flat against the outer surface of the drum as depicted in FIG. 1. When inflated, (see left hand of FIG. 2) the tube expands to effect a wrapping of the end 412 of the carcass 273 about the bead ring 372 and back over the carcass as best seen in FIG. 2. This action is at times referred to as "lashing" or "lash back". As appears from the several Figures, the expandable tube mechanism is duplicated on the opposite end of the drum to effect lash back of the second bead ring 414.

In an operation of the present device, with the drum in its collapsed attitude as depicted in FIG. 1, a cylindrical carcass 273 comprising a plurality of reinforcing cords embedded in a polymer, is formed about the outer circumference of the drum with the transverse centerplane of the carcass substantially aligned with the transverse centerplane of the drum. The cords in the carcass extend along the width of the drum, and in a direction parallel to the rotational axis of the drum.

With the carcass in position, the bead rings 372 and 414 are positioned over the opposite ends 412 and 416 of the carcass on the drum by conventional mechanism which is not shown. After the bead rings are in position, the piston-cylinders 334 are activated (simultaneous activation of the piston-cylinders at opposite ends of the drum) to withdraw the piston rod 342 within each cylinder and thereby urge the wedge ring 328 against the several bead locks to move the bead locks radially outwardly to engage and lock the bead rings to the fifth and sixth carriages, hence to the drum. This action also serves to effect latching of the fifth and sixth carriages to their respective latch plate 344. Thereupon pressurized air is admitted into the cylindrical chamber 278 of each of the third and fourth carriages, causing the ring piston 280 of the third carriage, and its counterpart of the fourth carriage, to move the carriages inwardly of the drum. This movement of the carriages, acting through the linkages 234 and 236 and the link 242, results in radially outward displacement of the several segments 204 and the spacers 258 between the segments of the opposite halves of the drum, to effect radial expansion of the central portion of the carcass between the bead rings. Because the reinforcement cords of the carcass do not stretch, the radial expansion of the central portion of the carcass requires that the bead rings simultaneously move longitudinally inwardly of the drum as the radial expansion of the carcass takes place. This inward movement of the bead rings is effected by the inward movement of the third carriage in that the fifth carriage is latched to the latch plate of the third carriage and therefore moves inward simultaneously with and to the same extent as the third carriage is moved inwardly by the action of the piston-cylinders 334. This inward movement of the bead rings serves also to mold the ends of the carcass about the outward ends 418 of the several segments as the carcass is expanded radially outwardly past the inwardly moving bead rings. After the central portion of the carcass has reached its desired outer limit of expansion, the tubes 394 and 394' are inflated to lash back the ends of the carcass about the bead rings (see FIG. 2).

Following completion of lashing back of the carcass ends about the bead rings and the radial expansion of the central portion of the carcass, pressurized air is released from the cylinders 332 of the several piston-cylinders 334 causing the wedge rings 328 to move longitudinally outwardly under the influence of the several spring mechanisms 376. This movement of the wedge rings releases the bead locks, hence releases the fifth and sixth carriages from the bead rings, and releases the several latches to permit longitudinal separation of the fifth carriage from the third carriage and of the sixth carriage from the fourth carriage. Introduction of pressurized air to the cylinders 332 on the inward sides of their respective pistons 335 contained within the cylinders serves to further separate the fifth and sixth carriages from the third and fourth carriages, respectively, to provide space therebetween for performing secondary operations on the ends of the carcass and thereby complete the formation of the carcass. Upon completion of the carcass, pressurized air is released from the chamber 274 and introduced to the chamber 310 on the longitudinally outward side of the ring piston 280 thereby actuating the third carriage to move longitudinally outwardly and reverse the radial movement of the segments to move them to their collapsed positions. This release of the pressurized air occurs also, and simultaneously, within the left hand half of the drum (as viewed in FIG. 1) resulting in like movement of the same components of such left hand half of the drum, whereupon the completed carcass may be removed from the drum.

When it is desired to change the overall longitudinal width of the outer surface of the drum, with the segments in their collapsed positions, the drive rod 46 is rotated which causes the keys 138 and 140 on the collars 134 and 136 to slide longitudinally outwardly (in opposite directions) from the transverse centerplane of the drum. Recalling that the first and second carriages are bolted to the keys 138 and 140, the outward and directionally opposite movements of the keys results in like outward and directionally opposite movement of the first and second carriages, along with all the other carriages which are carried directly or indirectly with the first and second carriages. These movements of the carriages opens up the drum from its transverse centerplane and causes the set of segments associated with one side of the drum to move away from the set of segments associated with the opposite side of the drum to permit ready removal of the spacers 258 from between these sets of segments and replacement thereof with either shorter or longer segments, as desired. Thereupon the drive rod is rotated reversely causing the drum to close toward its transverse centerplane and permitting the capture of the fresh spacers between the two sets of segments. Recalling that the first and second carriages are further interconnected by means of the racks and pinions, it will be recognized that these elements of the device aid in maintaining matched longitudinal positioning of the first and second carriages as they are displaced away from and toward the transverse centerplane of the drum. Notably, removal and replacement of the spacers does not require any disassembly of any portion of the drum other than the spacers themselves. Further, the only mechanical motion required is rotation of the drive rod 46 which is readily accomplished by a hand wrench acting upon the lug 86 on the end of the drive rod.

In the depicted embodiment, the outer circumference of each of the sets of segments of the drum is covered by means of a resilient elastomeric ring 420. The space between the inward side edges 422 and 424 of these rings is depicted as being closed by a further elastomeric ring 426. These elastomeric rings primarily are a convenience in maintaining the spacers in position as the drum is being opened or closed.

Pressurized air for the operation of the several components of the present device may be provided by conventional means including proper conduits leading from the source of pressurized air to the various components where required. The control of the flow of the air may be provided by conventional means such as rotary valves, or by other valving means well known in the art or as will be obvious to one skilled in the art. As desired, electronic controllers may be employed in programming the operation of the several components of the present device. The flow of pressurized air from one end of the drum to the other end thereof may be provided for by means of sealed tubes, such as tubes 428 and 430 which lead through the drum between the opposite ends thereof. Other techniques for providing motive forces for the several movements of the components of the present device will be apparent to one skilled in the art, given the present description, including the drawings. For example, pressurized hydraulic fluid may be substituted for the pressurized air.

Whereas specific embodiments of the present invention have been described, it is not intended that the invention be limited other than by the claims appended hereto. For example, whereas there is described herein opening and closing of the drum about the transverse centerplane of the drum, it will be recognized that such opening and closing could be effected about a transverse plane other than the centerplane by selective adjustment of the relative sizes of the two opposing end portions of the drum. A still further alternative embodiment of the present invention comprises elimination of the ring pistons 280 within the cylindrical chambers 278 and effecting longitudinally inward movement of the third and fourth carriages by causing inward movement of the fifth carriage to physically contact and move the third carriage inwardly as the fifth carriage is moved inwardly. This latter embodiment, however, does not provide adequately for maintaining the carcass radially expanded while withdrawing of the fifth carriage to give space for secondary operations to be performed on the carcass at the ends thereof.

What is claimed is:

1. A bead lock drum useful in the manufacture of preform carcasses in the process of manufacturing a vehicle tire comprising a central shaft means first carriage means movably mounted on one end of said shaft means, second carriage means movable mounted on the opposite end of said shaft means, third carriage means movably mounted on said first carriage means for independent movement of said third carriage means with respect to said first carriage means, but being capable of being carried longitudinally of said drum upon longitudinal positioning of said first carriage means with respect to said shaft means, fourth carriage means movably mounted on said second carriage means for independent movement of said fourth carriage means with respect to said second carriage means, but being capable of being carried longitudinally of said drum upon longitudinal positioning of said second carriage means with respect to said shaft means, fifth carriage means movably mounted on said first carriage means for independent movement of said fifth carriage means with respect to said first carriage means, but being capable of being carried longitudinally of said drum upon longitudinal positioning of said first carriage means with respect to said shaft means, sixth carriage means movably mounted on said second carriage means for independent movement of said sixth carriage means with respect to said second carriage means, but being capable of being carried longitudinally of said drum upon longitudinal positioning of said second carriage means with respect to said shaft means, a plurality of circumference-defining segments, said segments being divided into at least first and second sets of said segments, the segments of each of said sets being of a length which is less than one-half the overall desired width of said drum, said first set of said segments defining the outer circumference of said drum on one side of a transverse plane through said drum and said second set of said segments defining the outer circumference of said drum on the opposite side of said transverse plane, linkage means mounting said first set of said circumference-defining segments to said first and third carriage means and mounting said second set of said circumference-defining segments to said second and fourth carriage means respectively whereby movement of said carriage means relative to one another and acting through said linkage means effects radial movement of said circumference-defining segments, carcass means disposed about the outer circumference of said drum, first and second ring beads disposed about said carcass adjacent respective ones of the opposite ends of said drum with one of said ring beads being in substantially circumferential alignment with, but radially spaced-apart from, respective ones of said fifth and sixth carriage means, first and second radially expandable means disposed between said fifth and sixth carriage means, respectively, and respective ones of said first and second ring beads, first and second camming means associated with respective ones of said fifth and sixth carriage means for urging respective ones of said expandable means radially outwardly of said drum and into engagement with said respective ones of said ring beads to thereby lock said ring beads in spaced apart relationship to one another, in concentric alignment with said shaft means, in parallelism with one another, and in a transverse plane passing through said shaft means at right angles to the length of said shaft means, motive power means associated with said fifth carriage means for moving said fifth carriage means toward said third carriage means whereupon said first camming means associated with said fifth carriage means is urged into expanding engagement with said first radially expandable means which, in turn, expands into locking engagement with its respective ring bead, means effecting movement of said third carriage means longitudinally inwardly of said drum to activate said first linkage means to radially expand said first set of said circumference-defining segments and simultaneously carry said ring bead locked to said fifth carriage means longitudinally inwardly of said drum, motive power means associated with said sixth carriage means for moving said sixth carriage means toward said fourth carriage means whereupon said second camming means associated with said sixth carriage means is urged into expanding engagement with said second radially expandable means which, in turn, expands into locking engagement with its respective ring bead, means effecting movement of said fourth carriage means longitudinally inwardly of said drum to activate said second linkage means to radially expand said second set of said circumference-defining segments and simultaneously carry said ring bead locked to said sixth carriage means longitudinally inwardly of said drum, means for moving said first and second carriage means along the length of said shaft means simultaneously but in opposite directions whereby longitudinal movement of said first and second carriage means away from one another in a longitudinal direction serves to longitudinally separate said first and second sets of said circumference-defining segments, and longitudinal movement of said first and second carriage means toward one another serves to bring said first and second sets of segments toward one another longitudinally of said drum, and spacer means disposed about the outer circumference of said drum and between and longitudinally aligned with said sets of segments, said spacer means being removable from said drum when said sets of segments are moved away from one another and being captured between said sets of segments when said sets of segments are moved inwardly of said drum.

2. The invention of claim 1 wherein said transverse plane comprises the transverse centerplane of said drum.

3. The invention of claim 1 wherein said central shaft means includes a tubular housing means and a drive rod disposed within and concentrically of said housing means.

4. The invention of claim 3 and including means mounting said drive rod for longitudinal adjustment of the position of said drive rod along the length dimension of said housing means.

5. The invention of claim 4 wherein said means mounting said drive rod includes adjustment nut means fixedly secured to said drive rod and threadably received within said housing means for movement of the location of said adjustment nut means upon the rotation of the same, hence the location of the longitudinal position of said drive rod means within said housing means.

6. The invention of claim 3 and including key means disposed on said drive rod means and providing a driving connection between said drive rod means and said first and second carriage means.

7. The invention of claim 6 wherein said key means includes nut means threadably received on said drive rod and said key means extends radially from said drive rod means and through an elongated slot through said housing means whereby rotation of said drive rod means results in longitudinal movement of said key means.

8. The invention of claim 3 wherein said drive rod means includes a midpoint and is externally threaded with left-hand threads on one side of said midpoint and right-hand threads on the opposite side of said midpoint.

9. The invention of claim 1 and including rack and pinion gear means fixed to said central shaft means, said rack and pinion gear means including at least first and second rack means fixedly secured to said first and second carriage means whereby longitudinal movement of either of said first and second carriage means is transmitted through said rack and pinion gear means to the other of said first and second carriage means.

10. The invention of claim 1 wherein said spacer means includes a plurality of members, each having an arcuate surface which is disposed radially outermost of said drum and which defines a portion of the outer circumference of said drum when said members are in position as a part of said drum.

11. The invention of claim 1 and including first and second latch plates secured to said third and fourth carriage means, and further including a plurality of latch means carried by said fifth and sixth carriage means in position to lockingly engage said latch plates when said fifth and sixth carriage means engage said first and second latch plates on said third and fourth carriage means.

* * * * *